Feb. 14, 1961  E. R. ANDERSON  2,971,967
RECOVERY PROCESS
Filed Dec. 10, 1956
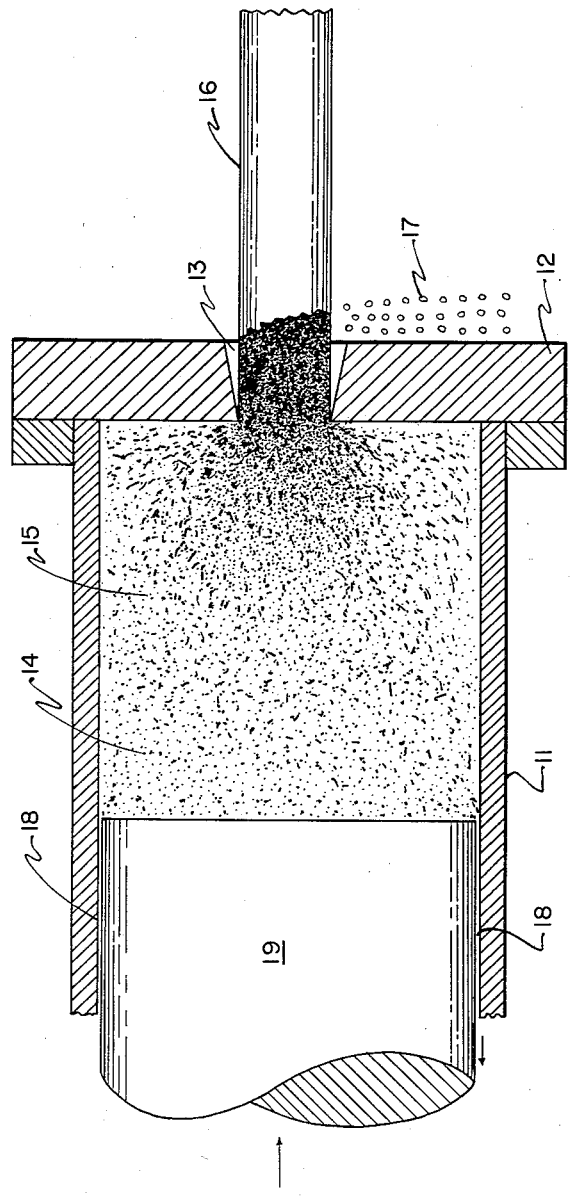

United States Patent Office 2,971,967
Patented Feb. 14, 1961

2,971,967
RECOVERY PROCESS

Elwood R. Anderson, Wilton, Conn., assignor to Ethyl Corporation, New York, N.Y., a corporation of Delaware Filed Dec. 10, 1956, Ser. No. 627,184

3 Claims. (Cl. 260—437)

This invention relates to the recovery of chemical reaction products. More specifically, the invention relates to the resolution of lead-containing reaction product mixtures, and to the improvement in recovery of lead metal therefrom. Even more particularly, the invention relates to the resolution of reaction residues from processes involving the alkylation of active lead to form alkyllead compounds, and to the recovery of components of such reaction mixtures or residues.

In a number of industrial processes for making desired lead compounds, a reaction product mixture is obtained including finely sub-divided lead metal particles, and other concurrent reaction products. An example of such a process is the manufacture of tetraethyllead, wherein a sodium-lead alloy is reacted with an alkylating agent such as ethyl chloride or diethyl sulfate. The products from such a reaction include, in addition to the desired tetraethyllead, substantial amounts of unreacted lead plus by-product metal salts such as a sulfate or sodium chloride. In the past, this reaction product mixture has been resolved into the desired component by several recovery operations. For example, the tetraethyllead content has been largely removed by immersing the reaction product mixture in water in a vessel and steam distilling the tetraethyllead as a vapor therefrom and subsequently condensing as a stratified tetraethyllead liquid layer. The sodium chloride component of the reaction mixture is dissolved in the aqueous phase, forming then a slurry of finely divided lead, salt in aqueous solution, and very minor amounts of lead compounds such as lead chloride plus trace amounts of additives added for improving the efficacy of the steam distillation.

This general recovery operation exhibited certain production disadvantages. Most specifically, it has been found in long experience that the recovery train described is a limiting factor in commercial production. The steam distillation operation requires very large amounts of steam and is a lengthy operation. The normal thermal drying operation, thereafter, is cumbersome and expensive, and the material resulting from the drying has been variable in quality. By this is meant that the drying has left variable quantities of normally liquid components in the dried material. This, in turn has given rise to frequent difficulties in the subsequent smelting operation. In short, the recovery system described above has been an expensive and limiting segment of previous manufacturing processes.

It is therefore an object of the present invention to provide a new and improved recovery operation particularly suitable for the resolution of reaction product mixtures of lead alkylation processes. A particular object of all forms of the invention is to provide a process wherein a portion of the reaction product mixture is further treated to effect additional separation and to engender the lead metal in a form which is particularly susceptible of effective and efficient smelting recovery operation.

An additional object of certain forms of the invention is to provide a two-stage recovery process, wherein an initial part recovery stage is coordinated with a following novel step, this latter step accomplishing a dual function of essentially completing a recovery operation and of forming the solid components into readily smeltable masses. An object of a particular embodiment of this latter form of the invention is to provide a combined modified steam distillation and further separation process characterized in that the steam distillation is deliberately curtailed to leave a predetermined more-than-normal amount of tetraethyllead in the reaction mixture, and the mixture is then processed by an extrusion step described more fully herein, for further separation of the tetraethyllead, isolation of the aqueous component, and the formation of a readily smeltable form of rod-like lead. Other objects of the present invention will be apparent hereinafter.

All forms of the process of the present invention are characterized by the extrusion of a reaction residue, or a portion of the reaction residue, under such conditions that the finely comminuted lead content thereof is formed into rod-like bundles or shapes of almost homogeneous, relatively dry lead. Concurrent with this extrusion step, the liquid phase forming a closely interspersed portion of the reaction or steam distillation residue is almost completely expressed from the solid phase of the feed material. Surprisingly, and as will be demonstrated hereafter, the liquid phase is released jointly with the said rod-like shapes either as a recoverable separate stream or as a surface coating on the shapes. Such adherent liquid is readily washed from the rod-like product shape.

The surprising discovery has also been made that the tetraethyllead and other normally liquid components of a reaction product mixture (or subsequent mixtures) is actually utilizable to obtain a particularly beneficial supplemental effect in the above mentioned extrusion step. When a sub-divided lead sludge system approximating in character the lead sludge of a typical reaction system is processed according to the extrusion step conditions mentioned, it is found that a tetraalkyllead component in conjunction with an aqueous phase provides a peculiar and salubrious lubricating effect. This permits a constant, but moderate pressure of operation, and, surprisingly, but concurrently the tetraethyllead and aqueous liquid are isolated from the lead particles as separate recoverable liquids. In a highly preferred form of the present process, the extrusion step is coupled with a primary recovery step, for example a steam distillation wherein only a portion, of at least about 50 percent, of the original alkyllead component is removed. This is then followed by the extrusion recovery step which benefits from the presence of the non-removed alkyllead compound, but nevertheless provides a final, high degree of separation thereof. This combination provides a very high degree of recovery in a shorter time period as well as producing a solid type lead particularly suitable for smelting.

The details of the several embodiments of the process and the method of its operation, as well as of typical equipment suitable for its operation will be fully understood from the detailed description hereinafter and the accompanying figure, which is a cross-sectional view of a typical charge being extruded according to the process of the present invention.

The details of operation and of the benefits of the invention will be readily understood by firstly describing the phenomena occurring during a typical embodiment of one form of the invention, as illustrated by the single figure. Referring to the figure this is a cross-sectional view of a supply of a typical high solids sludge during the processing of this supply by an embodiment of the present process. In all forms of the process a charge supply of such a lead containing "system" is present in an initial chamber, defined, for example, by a generally cylindrical wall 11, one end of the chamber being defined by a die or a die section 12. A ram 19 fits in the chamber and provides for the application of pressure to the charge. In the present embodiment, the die aperture is a sharp edge cylindrical hole 13. Pressure is applied to the charge, in the direction indicated, causing movement of the material toward the die end of the chamber 11, and through the die aperture 13.

During this initial operation, wherein the solids are generally moving only laterally, the specific volume of the system is decreased by, apparently, the solids being pushed closer together without significant deformation. This result is accomplished by the displacement of a respectable portion of the liquid phase or phases of the charged material. Such liquid is released from the chamber 11 normally by back-flow through the clearance 18 between the periphery of the ram 19 and the chamber wall 11. This clearance need not be large and is usually of the order of several thousandths of an inch.

The actual physical configuration of the materials processed is difficult to describe because of the complicated heterogeneous character of the system being processed. Generally, the several portions of the reaction system include an initial untreated portion 14, a portion which is herein described as a flow portion 15 and a product portion 16. The solids of the charge 14 are substantially unaltered by the application of pressure thereto except inasmuch as they are moved laterally in the direction of the die 12 at the end of the chamber. Typical charges can be considered as a heterogeneous system or sludge of predominantly lead particles, with variable quantities of the liquid phase present in the sludge. The liquid phase includes not only a liquid alkyllead material, but also an aqueous phase. This aqueous phase can vary in proportions and also in composition, dependent on the previous history of the sludge. Thus, the aqueous phase can be a sodium chloride brine varying in strength from a percent or so of salt content to almost a saturated brine. The individual solid particles are more or less mingled with the liquid phase. In the "flow" portion 15, as indicated by the converging lines of movement indicated, the flow of material causes the discrete particles to flow toward the die 12. In passing through this region, and through the aperture or orifice 13, a striking and highly beneficial phenomena occurs in that the liquid-solid phases are further substantially separated. The term separation here means that the major component, viz., the lead particles, are apparently cold-worked together to form a rod-like bundle or a product portion 16. Concurrently with the movement of this rod-like product portion out of the die aperture 13, the liquid phase is expressed as discrete globules 17 plus in addition a very minor quantity adjacent or upon the surface of the rod-like, product portion 16.

The liquid phase 17 is largely tetraethyllead plus water, the proportion dependent upon the composition of the initially charged system and certain other factors. The liquid phase is collected by gravity flow in appropriate containers and the tetraethyllead can be recovered by stratification and withdrawal from the aqueous phase. Good cleansing of the product rods 16 can be further accomplished by a supplemental aqueous spray (not shown) to flush off small quantities of liquid tetraethyllead on the surface of the bundle. The product rods can be broken later into relatively short segments for further processing and smelting for recovery of the lead component.

It will be apparent to those skilled in the art that the operation generally described above is subject to numerous variations in specific embodiments. The details of the preferred conditions will be discussed more fully hereinafter. The process is illustrated more specifically below by the following examples of the process. Except as otherwise stated "pressure" as used in the following examples means the pressure in pounds per square inch, and compositions are in weight percentages.

*Example I*

Tetraethyllead was prepared by reacting monosodium lead alloy and ethyl chloride in a closed reaction vessel at a temperature of about 80–90° C. An appreciable stoichiometric excess of ethyl chloride was used, and upon completion of the reaction, the major portion of this excess and unreacted ethyl chloride was released by venting to appropriate recovery apparatus.

The reaction mass resultant from this reaction was a stiff, semi-dry sludge, or "reaction mass" having approximately the following composition:

| | Weight percent |
|---|---|
| Tetraethyllead | 24 |
| Lead | 56 |
| Sodium chloride | 19 |
| Sodium and traces of ethyl chloride and other minor components | 0.5 |

The reaction mass was discharged into a steam distillation vessel having a pool of water therein, the water having certain still aid materials dissolved in the liquid phase. The mixed phase system was continuously agitated, and steam was passed through to distill off the tetraethyllead. The steam distillation was continued until a major portion of the tetraethyllead was removed overhead—the vapor stream discharged from the still was condensed in water cooled condensers, the condensate forming a two-phase liquid system, the tetraethyllead being the lower phase and thus readily separable therefrom. Upon completion of this distillation the still residue, or still "sludge" was discharged to a holdup vessel or pit. This above reaction and distillation was repeated many times, and the stored sludge was used in the present process in the manner described below. A typical analysis of material cumulated in this manner was as follows:

| | Weight percent |
|---|---|
| Tetraethyllead | 1.33 |
| Water or dilute brine | 12.78 |
| Lead | 85+ |

It will be seen that the steam distillation described above resulted in removal of 96 or more percent of the tetraethyllead initially present in the reaction mass. In addition, the stirring and contacting of the reaction mass with the aqueous system in the steam distillation operation, and in the subsequent holdup vessel resulted in leaching out of all but very minor amounts of the substantial quantity of solid sodium chloride originally present. Any free reacting alkali components, such as sodium (or sodium lead alloy) was converted to corresponding compounds by the aqueous phase. Minor amounts of other components are detectable in such sludges but are not reported, these components being the still additive assistant materials mentioned above.

A charge of supply of the accumulated sludge was obtained and allowed to "free drain," that is, was allowed to rest on a stationary metal surface until excess liquid phase had run off. Analysis of this material is as reported above.

A number of portions of this material was then processed in a cylindrical chamber press or extruder, the chamber having one end formed by a moving ram snugly fitted to the chamber walls, the other end of the chamber having a cylindrical die closure therein. The extrusion ratio employed was 31.9:1.0. By extrusion ratio is meant the ratio of the transverse areas of a cross-section of the chamber to the opening of the die. A pressure of approximately 26,000 pounds per square inch was applied to the charge by external force on the ram.

The charge material was forced through the die at a rapid and relatively steady rate, the movement of the rod-like material from the die being accompanied by more or less pulsating or intermittent flow of liquid around the periphery of the die in sufficient quantities to rapidly drip from the external face thereof. In addition a film of the liquid adhered to the surface of the rod-like product.

Portions of the rod-like product were obtained and lightly surface wiped to remove clearly separated liquid phase adhering to the surface. Samples of this solid product material were analyzed with the following results:

| | Weight percent |
|---|---|
| Tetraethyllead | 0.6 |
| Water | 0.4 |
| Lead | 99 |

The solid product had a high density of about 10 grams per cubic centimeter, showing the effectiveness of the operation in converting the finely divided lead to a product approaching a homogeneous system. Inspection of the above results shows that in addition to forming the lead material into a cohesive solidlike product, over two-thirds of the initial tetraethyllead content was removed and was recoverable, and in addition the water content was reduced 97+ percent. This product was found to be readily smelted and exhibited no problems arising from high surface characteristics or troubles which had plagued the smelting operations heretofore.

The example following illustrated a similar operation using an appreciably smaller die, or, alternatively stated, an appreciably higher extrusion ratio.

*Example II*

A supply of sludge derived in the same manner as that employed in Example I was again extruded using a similar operation to the procedure described in Example I. However, in this instance an extrusion ratio of 52.3:1.0 was employed. The extrusion pressure was of the order of about 28,000 on the material charged to the extruder barrel or chamber.

The rod-like product material was again similar in physical properties to the product from Example I above. The average tetraethyllead content was 0.7 weight percent, and the average water content was 0.23 weight percent. These results show a removal of over 60 percent of the original tetraethyllead, and above 98.5 percent removal of the water in the free drained sludge charged.

*Example III*

The procedure of Examples I and II was again repeated, except in this instance the sludge employed as a feed had a somewhat higher tetraethyllead content, containing 1.97 weight percent tetraethyllead and 8.6 percent water as dilute aqueous salt solution. In carrying out the extrusion recovery operation, a pressure of about 25,000 was employed, and an extrusion ratio of 41.6:1.0.

The extruded solid product was again very similar in physical properties to that produced in the preceding examples. A removal of approximately 70 percent of the tetraethyllead was effected, and about 97 percent or more of the aqueous phase.

The chemical origin of the sludge employed in the process is not a particular limitation although the process finds widest usage in treating materials from commercial type operations. However, other reactions than that described in Example I above can be employed as the source at the tetraethyllead. For example, when tetraethyllead, or other alkyllead compounds, are produced according to the process described in the Calingaert et al. Patent 2,535,190, a reaction mixture including magnesium chloride, sodium chloride, tetraethyllead, and unreacted lead is produced. When such a reaction mass is steam distilled as described in Example I and the resultant lead containing sludge is processed as in Example I, II, or III, similar results are achieved. Similarly, the sludge may be the result of a steam distillation of a reaction mass made by reacting a magnesium lead alloy and ethyl chloride, as described in Shapiro Patent 2,535,235. When the reaction mass is generated by reacting a calcium lead alloy, as described in Krohn et al. Patent 2,594,183, substantially equivalent results are obtained when processing the steam distilled residue according to the conditions of the foregoing examples.

In the foregoing examples, the tetraethyllead generated in the synthesis reaction was removed in fairly high degree prior to processing according to the present method. Thus, roughly 95 or 96 percent tetraethyllead in the original reaction mass was separated prior to feeding the lead containing sludge residue to the extrusion operation.

Although steam distillation is the most widely employed initial recovery operation, this is not an essential precursor in preparation of the lead sludge. In other words, other types of "primary" or initial recovery steps can be employed. Thus, for example, the reaction mass of Example I can be mixed with fresh ethyl chloride to dissolve the bulk of the tetraethyllead therein, and then an aqueous liquid phase can be added to segregate the entire system into three phases, a bottom predominantly lead containing aqueous layer (also containing some small amount of non-separated tetraalkyllead) a surmounting aqueous layer, and a top layer of solvent having most of the tetraethyllead therein. When the wet lead solids sludge released by this initial recovery operation is substituted for the sludge used in the extrusion described in Example I, very similar or almost equivalent results are provided.

The reaction technique most frequently employed in generating tetraalkyllead compounds is that wherein a relatively small physical quantity of alkylating agent liquid is employed. In recent years it has been found that a very substantial excess is highly beneficial, as is described in U.S. patent to Neher et al. 2,644,827. When tetraethyllead is synthesized according to the teaching of the Neher process, viz., by employing a high excess of liquid ethyl chloride and producing a thin slurry of tetraethyllead, this slurry mixture can be processed as generally described above. In other words, the slurry contains substantially all the tetraethyllead dissolved in the ethyl chloride, and the system can be resolved into several discrete layers by stratifying with a very dilute aqueous acid solution. Generally, similar results are achieved when extruding the lead containing solids sludge from such an operation, although frequently somewhat higher extrusion pressures are necessary because of the quite low tetraethyllead content, it being discovered as already noted that the tetraethyllead in conjunction with water particularly is a highly effective lubricant for the operation.

Tetraethyllead is the most frequently encountered alkyllead component of sludges processed according to the present invention, inasmuch as it finds wide usage as an antiknock material. Other alkylated lead compounds are, however, substantial equivalents as initial components in the charge. For example, when a dimethyldiethyllead is the alkylated lead material present as a sludge component in any of the examples herein, substantially similar results are achieved. Likewise similar results are obtained when the alkyllead compound is, for example, tetraisopropyllead, tetramethyllead, methyltriethyllead, ethyltrimethyllead and others.

As has been heretofore mentioned, a particular form of the present invention is an extrusion as generally described and illustrated above in combination with a preceding operation, for example, a steam distillation, which has been curtailed or adjusted to provide a process sludge having appreciable quantities of tetraethyllead remaining therein. This embodiment of the invention is illustrated by the following example.

*Example IV*

A pasty reaction mixture containing tetraethyllead was synthesized generally in the same manner as described in Example I. The reaction mass, after venting the excess ethyl chloride was again passed or charged to a steam distillation vessel having a pool of water therein. The steam distillation was carried out generally as already described except that it was deliberately curtailed when only about 50–55 percent of the tetraethyllead in the reaction mass had been removed. The steam distillation was then terminated and the so-called still sludge was passed to a holdup vessel as before. Portions of the sludge so accumulated were free drained and analyzed as follows:

| | Weight percent |
|---|---|
| Tetraethyllead | 14.86 |
| Water | 10.88 |
| Lead | 74 |

Portions of this free drained material were than processed generally as described in Example I, that is, using an extrusion chamber-die apparatus having an extrusion ratio of 31.9:1.0. A pressure of 14,700 was applied and again the product was rapidly extruded as a rod-like cohesive material, easily fracturable but relatively sturdy.

Samples of the rod-like, cohesive billet or product of this extrusion were analyzed and showed a composition of 0.5 percent tetraethyllead and 0.2 weight percent water. It will be seen that the above extrusion operation resulted in a removal of 97.5 percent of the tetraethyllead fed to the extrusion step. The amount of water removal was even higher or about 99 percent. Further, it should be noted that the overall efficiency separation of tetraethyllead, based upon that present in the original reaction mass was approaching 99 percent, or significantly higher than obtained in the steam distillation employed in preparing the charge for extrusion in Examples I and II given above. This is particularly beneficial in that a higher overall effectiveness of separation was provided in a shorter overall processing time.

A curtailed steam distillation operation is not the only quite suitable initial recovery step for the preferred integrated recovery operation. Thus, when desired, a part removal of the alkylated lead product component from the reaction mixture can be achieved by the displacement action of water alone. This type of operation is described generally in the Blitzer et al. Patent 2,622,093. In employing this treatment, for example, a more or less pasty reaction mixture is produced as first described in Example I. The reaction mass is then treated by contacting with hot water as disclosed in the Blitzer et al. patent, resulting in removal of about 60 to 80 percent of the tetraethyllead. This tetraethyllead is isolated as a discrete liquid phase, and the lead containing sludge is then free drained and processed as described above. Substantially equivalent results of final separation and compaction of the lead into a suitable form are achieved. In addition to the applicability of the process to sludges as described above, wherein the steam distillation (or another primary recovery operation) is drastically curtailed to provide a feed to the extrusion operation having tetraethyllead contents of the order of 12 or 15 weight percent, the above mentioned combination is highly applicable to intermediate types of sludges as illustrated by the following example.

*Example V*

A tetraethyllead reaction mass was prepared as in the foregoing examples and then charged to a steam distillation. The steam distillation was conducted as before except that it was terminated when only about 84 percent of the tetraethyllead had been removed by this operation. The still sludge was then discharged from the still and accumulated and processed by extrusion as described below. Analyses of this sludge, upon free draining, showed a concentration of about 5.7 weight percent tetraethyllead and 11.3 percent water, the balance being substantially all lead, except for minor amounts of dissolved salt in the aqueous phase.

Specimens of this sludge were extruded generally according to the above operation, again using a circular die at the end of a cylindrical ram chamber, the extrusion ratio being 76.5:1.0. The rod-like product had roughly 0.57 percent tetraethyllead and 0.4 percent water, this composition corresponding to tetraethyllead removal effectiveness of about 92 percent, and a water removal efficiency of about 97 percent. It will be noted that this sequence of operation results in a total separation of 99 percent of the tetraethyllead from the reaction mass charged to the steam still. The average density of the solid rod-like product material was again quite high, about 10.2 grams per milliliter.

In addition to the extrusion of the sludges, as in the foregoing examples, through a circular aperture, the process is also highly applicable to extrusion through dies or orifices of significantly different shapes which are frequently advantageous for incidental or ancillary purposes. An illustration of this type of operation is provided by the following example.

*Example VI*

A supply of tetraethyllead reaction mass was again prepared and steam distilled in part, generally as described in the preceding example. In this instance about 87 percent of tetraethyllead was removed by steam distillation, the free drained steam distillation sludge having approximately 4.6 percent tetraethyllead and 14.1 percent water.

The extrusion step of the operation was carried out by forcing the sludge through a die including a single round ended slot which had a length about 9 times in length times the width. The extrusion ratio of the extrusion chamber to the die was 41.6:1.0.

An extrusion pressure of 28,000 was applied to the charge and a flat or ribbon type bar product was readily obtained. Analyses of samples of this product showed an average tetraethyllead content of 0.8 percent and 0.5 percent water, this corresponding to a tetraethyllead removal from the raw sludge of 86 percent, or an overall removal efficiency of about 98+ percent. The effectiveness of water removal, or drying per se, of the raw sludge so processed was about 97 percent. In this instance, the density of the product bars was somewhat lower than in preceding examples, or about 9.6 grams per milliliter.

In addition to extrusion through single "slot type" dies as described in Example VI above, dies having a plurality of slots have been highly successfully used as described below in the following example.

*Example VII*

Again preparing reaction mass and then distilling a moderate amount of the available tetraethyllead therefrom by steam distillation, or about 73 percent removal by steam distillation, provided a sludge which upon free draining contained 9.2 percent tetraethyllead and 13.4 percent water.

The extrusion operation of this example was carried out using a two slotted die, wherein the individual slots had a total length:width ratio of 22:1. The extrusion ratio was 31.3:1.0. A relatively high pressure of 35,000 pounds per square inch was applied to the charge and smooth ribbons of relatively solid product material was forced through these slot apertures. Analyses of this material showed that it contained only about 0.5 percent tetraethyllead and 0.55 percent water. Accordingly, a 95 percent removal efficiency of the tetraethyllead in the feed sludge was obtained, providing an overall recovery effectiveness of 98.6 percent. The drying efficiency, expressed as water removal in the extrusion step was 97 percent.

The foregoing examples have involved the extrusion step of the operation at extrusion ratios of from 31.9 to over 100:1.0. The process is perfectly applicable at lower extrusion ratios, or, that is, with larger dies for the same cylinder-ram feeding mechanisms employed in some of the preceding examples. The following example illustrates such an operation.

Example VIII

Tetraethyllead reaction mass was again synthesized and steam distilled in part as in the preceding examples. In this instance about 64 percent tetraethyllead was removed by steam distillation, the free drained sludge then having approximately 11.8 percent tetraethyllead and 12.3 percent water. The extrusion step of the operation was carried out by forcing the sludge through a die having a slightly rounded entrance, the extrusion ratio employed being 6.9:1.0.

An extrusion pressure of 14,000 was applied and a relatively solid bar was extruded. Analyses of this material showed an average tetraethyllead content of 0.71 percent and a water content of 0.45 percent. Accordingly, a 95.5 percent removal efficiency of the tetraethyllead in this step was obtained, providing an overall recovery or removal effectiveness of about 98.4 percent. The drying efficiency was 97.2 percent.

Even higher diameter dies (or lower extrusion ratio) have been employed than in this example. The following example illustrates an even lower extrusion ratio.

Example IX

Again using the same procedure as in Example VIII above, and processing the same materials, but with an extrusion ratio of 3.1 and a pressure of extrusion of 8,000 pounds per square inch, an extruded product having 0.87 percent tetraethyllead and 0.55 percent water was obtained. This corresponded to a tetraethyllead removal effectiveness in the extrusion step of 94.5 percent, and a drying efficiency of 96.7 percent. The overall tetraethyllead separation efficiency of the steam distillation plus the extrusion was then 98 percent.

As previously mentioned, the liquid phases of the sludges processed according to the present invention are beneficial in the extrusion operation in providing a lubrication effect. Further, not only does each component of the liquid phases, viz. water or an aqueous solution, and a liquid tetraalkyllead compound, provide a lubrication effect, but it has been discovered that the alkyl lead component is particularly beneficial in this regard. The contribution of these components of the typical feeds to the process are illustrated in the following examples, which employ synthetic mixtures to form lead sludges.

Example X

A supply of commercial lead dust was obtained and carefully mixed with water. The lead dust was a fine powder, with the particle ranging in size from about 0.005 to 0.05 inch in maximum dimensions. The slurry or sludge as mixed contained 10 weight percent water.

A charge of this feed was inserted into an extrusion chamber, having a die providing an extrusion ratio of 12.2:1.0. A pressure of approximately 24,000 pounds per square inch was applied to the charge, and the extrusion proceeded smoothly and at a uniform speed. The rod-like product upon analysis contained 0.8 weight percent water, showing a removal efficiency of 92.5 percent.

Example XI

The procedure and equipment employed in Example X above was repeated, except that the sludge feed was mixed to contain only 3 percent water. Extrusion again proceedd smoothly but at a slightly lower pressure of 23,000 pounds on the charge. The product again was a uniformly compacted rod, having a water content of 0.8 percent. This corresponded to a removal efficiency for water removal of 73.8 percent.

Example XII

A supply of dry lead powder was charged to the extrusion apparatus and extrusion pressure was applied. No extrusion occurred in the pressure ranges which were successfully used for the preceding two examples, and the pressure was increased to approximately 44,000 pounds without any extrusion occurring.

Example XIII

A procedure similar to Example X above was used, except that in this instance a sludge was formulated employing 10 weight percent tetraethyllead carefully mixed with the dry lead dust. The charge or sludge so prepared was charged to the same extrusion apparatus and extrusion occurred at a pressure of about 17,000 pounds per square inch. A satisfactory rod-like product was obtained having a small amount of tetraethyllead therein.

Example XIV

The same procedure as in Example XIII above was followed, except in this case the quantity of tetraethyllead component was reduced to 1 weight percent. Satisfactory extrusion occurred at a pressure of 35,500 pounds per square inch. The extruded product had a final tetraethyllead content of 0.57 weight percent.

Example XV

The same procedure as in the two preceding examples was followed, except that in this case the tetraethyllead concentration was reduced to about ½ weight percent. Satisfactory extrusion was obtained at a pressure of 37,600 pounds per square inch.

The foregoing examples clearly illustrate the individual lubricating effect of an aqueous liquid and a liquid alkyllead component. From a comparison of the results Examples X, XII and XIII, it is seen that tetraalkyllead has an appreciably higher weight unit-effect, in reducing extrusion pressure, than does water. This is particularly significant, because of the greater density (or lower specific volume) of the tetraethyllead. Actually, it appears that tetraethyllead has about 2.1 times the lubricating effect of an equal volume of water. This is based upon the reduction in extrusion pressure, from an estimated incipient extrusion pressure of about 50,000 pounds for dry lead dust.

The beneficial lubricating effect of tetraethyllead is even more forcefully demonstrated by the following example, wherein both water and tetraethyllead were present as initial components.

Example XVI

An additional synthetic sludge was again prepared, except in this instance the sludge contained 3 weight percent water and ½ weight percent tetraethyllead. A charge of this material processed as in the preceding examples resulted in perfectly satisfactory extrusion at a pressure of about 16,700 pounds per square inch.

The operation was again repeated, but the composition of the synthetic sludge was again altered, by raising the water content to 10 weight percent and the tetraethyllead content to 1 weight percent. Surprisingly, this material did not exhibit sufficient "stiffness" to result in any extrusion whatsoever. In other words, no resistance to forcing through the extrusion die was encountered, and there was no formation of a solid type product shape.

The results with this synthetic sludge are particularly illuminating as to the synergistic effect of an alkylated lead compound in conjunction with water or an aqueous phase. It will be noted that only ½ percent of tetraethyllead, in conjunction with water at a 3 percent concentration resulted in a reduction of extrusion pressure to below the pressure required when 10 percent tetraethyllead was used alone. Further the extrusion pressure with this combination was over 20,000 pounds below the pressure required when ½ percent of tetraethyllead was the only component. In other words, tetraethyllead at a concentration of ½ percent, or preferably, above 1 percent, exhibits a remarkable synergistic effect in conjunction with an aqueous phase.

It should be understood that the synthetic or specially formulated lead containing sludges of the foregoing Examples X–XVI are different in some respects in treating according to the present process, from the "naturally occurring" sludges, that is, sludges which are resultant from chemical reactions. For comparison of the relative effects and synergistic effects of the alkylated lead liquid component and the aqueous phase, the foregoing examples are particularly effective. To illustrate the performance of sludges from a chemical operation treated in the identical manner as in the above described extrusion experiments, the following working example is illustrative.

Example XVII

A tetraethyllead reaction mass was manufactured or synthesized in a manner generally described in Examples I and following, and was then steam distilled under such conditions that approximately 90 percent of the tetraethyllead was removed in this primary recovery operation. The free drained sludge was then segregated and analyzed and found to contain 3.5 weight percent tetraethyllead and 18.3 percent water, plus minor quantities of dissolved sodium chloride.

Portions of this sludge were then extruded in the apparatus employed in Examples X–XVI above, using an extrusion ratio of 12.2:1.0 again. A pressure of 14,000 pounds per square inch was applied and resulted in perfectly satisfactory extrusion and separation of a large proportion of the tetraethyllead component of the feed sludge. The rod-like product contained an average concentration of 0.6 weight percent tetraethyllead and 0.45 weight percent water. This corresponded to a separation of 86 percent of the tetraethyllead introduced at this point and provided an overall recovery of about 98 percent.

From the foregoing description and details it will be seen that the process is capable of numerous variants and ramifications some of which are discussed below. Thus, the extrusion step of the process is highly operable through a very wide range of extrusion ratios (extrusion ratio being as already defined, viz. the cross-sectional area ratios of the extrusion chamber preceding the die to the die area). Thus, in Example IV an extrusion ratio of 103 was used, and in Example IX an extrusion ratio of as low as 3.1 was very successfully employed. Generally, as discussed at a later point herein, the extrusion ratio affects the extrusion pressure for reasonable production rate. Although not limiting, it is highly preferred to operate with an extrusion ratio in the range of 5:1 to 50:1, and even more preferably, below about 20:1.

It will further be evident from the above examples that appreciable variation in die diameter, or otherwise in die configuration, can be provided as desired. Round dies having a diameter of about 1.5 inches have been quite successfully used, and on the other hand dies as small as 0.18 inch in diameter have also been effectively used. It will be clear that a larger die will facilitate correspondingly greater production in accordance with the cross-sectional area, for the linear rate of extrusion being approximately the same. It is preferred that the die diameter not normally exceed about 2 to 3 inches (when a single hole round die is employed), with extrusion ratios in the ranges discussed.

As already noted, dies having sharp edge entries are highly successful. It has been found however that somewhat improved results are provided when the entrance to the die has a smoothly rounded entrance edge. Generally the radius of this entrance should be from about $\frac{1}{32}$ to about $\frac{3}{8}$ of an inch. In addition to rounded entries, frequently entry blocks or inserts will be expeditiously employed within the extrusion chamber immediately before the die proper. These entry blocks are frequently provided with frusto-conic openings converging toward the die proper with conic angles of, usually, 60 to 120 degrees. These inserts do not appreciably change the characteristics of the process, but do have the effect of distributing the thrust against the die under extrusion pressures over a wide area thus putting less cantilever strain on the material of the die. In addition, conic entries result in a reduction of the extrusion pressure necessary for a given operation.

Generally the die should be fabricated of a hard and tough, high temper, steel or alloy steel. Similarly, the ram and die chamber should be constructed of appropriate materials.

The above given examples all involved the utilization of ram type mechanisms for forcing the lead containing feed material through the die or aperture. In many instances, this type of mechanism will be eminently suitable for the process. In other instances it will be desired to provide a continuous operation, and in those cases a screw type extrusion machine is highly suitable the screw mechanism performing similarly to the reciprocating ram in providing pressure.

From the foregoing description and examples it will be seen that the high solids sludge in all instances include as lubricating components both an alkyllead component and water. The water may have, of course, variable amounts of dissolved compounds as solutes. The quantities of these two normally liquid components is not highly critical, in that they exhibit a mutual synergism. In all instances sufficient amounts should be present in combination to assure the lubricating function, and this is achieved when the alkyllead is initially present in at least about one-half percent concentration, with somewhat greater proportions of water. Generally, however, it is found that for best results the alkyllead should be above 1 percent concentration, and, further, that the water content should be in the range of above 5 percent. When the alkyllead concentration is low, however, it is quite desirable that the water concentration should be several fold, preferably at least 5, and even more suitably about 10 times the concentration of the alkyllead. It will be noted, in the examples, that the alkyllead content can be relatively high—in the range of 15 percent or even higher. In such instances, a larger proportion of this component initially present is withdrawn from the process by backflow, that is, from the extrusion chamber by seepage around the pressure applying element.

A high solids content of above about 75 percent is found to be the most desirable (the term high solids meaning the amount of insoluble solids in the feed, which is substantially all finely divided lead).

The particular selection of an embodiment of a process will, of course, be dependent upon a number of technical and economical factors readily susceptible of appraisal. In all cases, the benefits of the process are derived, viz: the separation of a high and valuable proportion of alkyllead present plus the formulation of predominantly solid materials which are readily susceptible of subsequent smelting.

A careful study of the relationship of the numerous variables within the process discloses a number of particularly interesting relationships. Firstly, it is found that the pressure of extrusion can be related to the extrusion ratio by expressions such as follows:

$$P = 2 + 6.2 \log_e \epsilon$$

where P equals pressure in 1,000's of pounds per square inch applied to the extrusion charge and $\epsilon$ equals extrusion ratio. It will be seen that the constant above, 2, represents the theoretical pressure required when the extrusion ratio is unity, e.g., when there is no size reduction by extrusion. Thus, this value is subsequently equivalent to the lateral friction as an isolated factor under extrusion conditions. It is indeed surprising that the factor is as low as found, and this is attributable to the peculiar characteristics of the feed materials, and to the lubrication effect of the liquid components. It will be understood that the numerical contents of this relationship will vary somewhat according to the particular proportions or design of the equipment and to the preceding history of the sludge.

A second important relationship is concerned with the amount of void volume in the resultant rod-like product. The void volume can be considered an alternative expression of a product attribute—the degree of attainment of homogeneity—which is basically even more significant than the percent removal of individual liquid components. Since the density of alkyllead compounds and water (or dilute aqueous solutions) differ greatly, it will be seen that the amount of voids represents a cumulative measurement of the effectiveness of a given operation; which eliminates any inconsistencies otherwise resultant from the density differences. A careful analysis of the results of a substantial number of operations was made which showed the following relationship:

$$V = 1.5 - 0.94 \log P + 0.17 (\log P)^2$$

where $V$=percent voids attributed to liquid, $P$=pressure, 1000 pounds per square inch, and the logarithm is to the base $e$. The foregoing relation is based on a group of operations wherein the extrusion ratio was 12.2 and the die was provided with a conical entry with a convergence angle of about 90°. The numerical constants in the foregoing relation are specific to this extrusion ratio and die configuration. However, similar relations exist for other extrusion ratios and die configurations. Generally, this equation expresses the discovery that the minimum voids in the product base are provided by extrusion pressures in the range of about 14,000 to about 22,000. This pressure range is not critically limiting, because a satisfactory product can be made at extrusion pressures both below and above this range, for example from about 8,000 to about 35,000 pounds pressure. However, operation in the preferred range results in the smallest amount of voids attributable to liquid in addition to a satisfactory solids product.

Having described the process of my invention and the best manner of its operation, what is claimed is:

1. In a process for manufacture and recovery of a tetraalkyllead compound, said process providing a reaction product mixture including a normally liquid tetraalkyllead, finely subdivided lead metal particles and other concurrent reaction products, the improved method of recovery, and the concurrent treatment of the said lead particles, comprising, separating a portion only of the tetraalkyllead by a primary separation, said separation including contacting the reaction product mixture with an aqueous liquid, separating the portion of tetraalkyllead, and forming a high solids sludge comprising finely divided lead solids, the non-separated tetraalkyllead, and an aqueous liquid, then applying pressure to said sludge in an elongated extrusion zone having an end die boundary, and forcing the said sludge toward said die boundary, and displacing thereby portions of both of the said liquids in a direction away from said die boundary and out of said zone, and then by further pressure concurrently extruding the lead solids and forcing the remaining liquids through an extrusion orifice in said end boundary, said orifice having a smaller area than the transverse area of the extrusion zone, the further pressure applied in the extrusion zone being sufficient to extrude the lead solids as a cohesive, substantially liquid free, lead shape, and to provide the portions of the liquids forced through the said orifice as essentially solids free liquids.

2. In a process for manufacture and recovery of tetraethyllead, said process providing a reaction product mixture including tetraethyllead, subdivided lead metal particles, and an inorganic salt reaction product, the improved method of recovery, and the concurrent treatment of the said subdivided lead particles comprising separating a portion only of from about one-half of the tetraethyllead to about 96 percent of the tetraethyllead present in said reaction product mixture by a primary separation, said separation including contacting the reaction product mixture with an aqueous liquid, separating the portion of tetraethyllead, and forming a high solids sludge including the non-separated tetraethyllead, the finely subdivided lead metal particles and an aqueous phase, and then applying pressure to said sludge in an elongated extrusion zone having an end die boundary having an extrusion orifice therein, said orifice being smaller in area than the transverse area of the extrusion zone, forcing the sludge toward said die boundary and displacing thereby portions of both of the liquids in said sludge in a direction away from said die boundary and out of said zone, and then by further pressure concurrently extruding the lead solids and forcing the remaining liquids through said orifice, the further pressure being sufficient to extrude the lead solids as a cohesive, substantially liquid-free solid lead shape and to provide the liquids portions as essentially solids-free liquids.

3. In a process for manufacture and recovery of tetraethyllead, said process providing a reaction product mixture including tetraethyllead, finely divided lead and sodium chloride, the improved method of recovery, and concurrent treatment of the said finely divided lead, comprising a primary separation including contacting the reaction product mixture with an aqueous liquid and steam distilling from the mixture a portion only, of at least one-half to about 96 percent of the tetraethyllead present, and forming a high solids sludge including subdivided lead solids, an aqueous solution of sodium chloride, and tetraethyllead, then charging said sludge to an elongated extrusion zone having an extrusion orifice in an end die boundary and applying pressure on the sludge in said zone in the direction of said end die boundary, and forcing the sludge toward the die boundary and displacing thereby portions of both the liquids in a direction away from said die boundary and out of said zone and then by further pressure concurrently extruding the lead solids and forcing the remaining portion of the liquids through the extrusion orifice in said die boundary, the ratio of the transverse area of the extrusion zone to the area of the orifice, being from about 5:1 to 20:1 and the further pressure applied in the extrusion zone being from about 14,000 to about 20,000 pounds per square inch, the lead being thereby extruded through said orifice as a cohesive, substantially liquid-free, solid lead shape, and the portions of the liquids discharged through said orifice being essentially solids free liquids.

References Cited in the file of this patent
UNITED STATES PATENTS

| | | |
|---|---|---|
| 2,212,116 | Eberenz | Aug. 20, 1940 |
| 2,661,361 | Granjean | Dec. 1, 1953 |
| 2,676,882 | Hatch | Apr. 27, 1954 |

UNITED STATES PATENT OFFICE
CERTIFICATE OF CORRECTION

Patent No. 2,971,967 February 14, 1961

Elwood R. Anderson

It is hereby certified that error appears in the above numbered patent requiring correction and that the said Letters Patent should read as corrected below.

Column 5, line 66, for "at" read -- of --; column 9, lines 65 and 66, for "proceedd" read -- proceeded --; column 14, line 54, for "20,000" read -- 22,000 --.

Signed and sealed this 26th day of September 1961.

(SEAL)
Attest:

ERNEST W. SWIDER
Attesting Officer

DAVID L. LADD
Commissioner of Patents
USCOMM-DC